United States Patent [19]

Bestock et al.

[11] Patent Number: 4,933,971
[45] Date of Patent: Jun. 12, 1990

[54] METHOD FOR ENCRYPTING TRANSMITTED DATA USING A UNIQUE KEY

[75] Inventors: Ralph R. Bestock, Los Altos; Jae-Young Kim, San Jose; Webster D. Hopkins, Gilroy; Martin M. Atalla, Atherton, all of Calif.

[73] Assignee: Tandem Computers Incorporated, San Jose, Calif.

[21] Appl. No.: 323,485

[22] Filed: Apr. 14, 1989

[51] Int. Cl.⁵ .............................................. H04L 9/02
[52] U.S. Cl. ...................................... 380/44; 380/21; 380/24; 380/29; 380/50
[58] Field of Search ............................... 380/4, 23–25, 380/29, 44, 49, 50, 28, 21, 45; 364/200, 900, 222.5, 224.21, 260.81, 260.9, 286.4, 286.5, 918.7, 943.7, 944.5

[56] References Cited

U.S. PATENT DOCUMENTS

| | | | |
|---|---|---|---|
| 4,182,933 | 1/1980 | Rosenblum | 380/21 |
| 4,193,131 | 3/1980 | Lennon et al. | 380/25 |
| 4,203,166 | 5/1980 | Ehrsam et al. | 380/49 X |
| 4,218,738 | 8/1980 | Matyas et al. | 380/25 |
| 4,227,253 | 10/1980 | Ehrsam et al. | 380/45 |
| 4,238,853 | 12/1980 | Ehrsam et al. | 380/45 |
| 4,238,854 | 12/1980 | Ehrsam et al. | 380/4 |
| 4,259,720 | 3/1981 | Campbell | 380/24 |
| 4,365,110 | 12/1982 | Lee et al. | 380/28 |
| 4,369,332 | 1/1983 | Campbell, Jr. | 380/43 |
| 4,386,234 | 5/1983 | Ehrsam et al. | 380/4 |
| 4,408,203 | 10/1983 | Campbell | 380/24 |
| 4,423,287 | 12/1983 | Zeidler | 380/24 |
| 4,488,001 | 12/1984 | Cooley et al. | 380/4 |
| 4,578,530 | 3/1986 | Zeidler | 380/24 |
| 4,605,820 | 9/1986 | Campbell, Jr. | 380/24 |
| 4,850,017 | 7/1989 | Matyas, Jr. et al. | 380/25 X |

Primary Examiner—Stephen C. Buczinski
Assistant Examiner—Bernarr Earl Gregory
Attorney, Agent, or Firm—A. C. Smith

[57] ABSTRACT

The invention comprises a method for encrypting data for communication between a host computer and each of a plurality of remote terminals in a network. A method is provided for periodically generating a unique dynamic encryption key for each of said plurality of terminals using a system seed key residing only in the host computer. The dynamic encryption key generated for use by said terminal in encrypting data transmitted to said host computer and for decrypting data received from said host computer. The method includes storing at said terminal the dynamic key previously generated by said host for said terminal.

35 Claims, 5 Drawing Sheets

TERMINAL INITIALIZATION SEQUENCE

TERMINAL INITIALIZATION SEQUENCE

METHOD FOR ENCRYPTING TRANSMITTED DATA USING A UNIQUE KEY

BACKGROUND OF THE INVENTION

This invention relates to the field of electronic transaction processing and more specifically to a method and means for encoding communications on a conventional computer network between a plurality of remote terminals and a host computer using an encryption technique wherein a unique key is generated by the host computer for each terminal and for every transaction or selected number of transactions by that terminal.

The advent of electronic financial transaction processing has precipitated an unprecedented revolution in the manner in which commercial transactions are conducted. Transactions which previously required the physical transfer of currency or commercial paper, such as bank checks, are now executed electronically using computers.

Over the past several years, electronic financial transaction processing has become commonplace. Ordinary consumers may now purchase groceries, gasoline, and airline tickets using an automated teller card or credit card issued to them by their respective banks. In using electronic financial transaction processing to purchase such goods and services, consumers electronically transfer funds from their own bank or credit account to the account of the respective vendor. Hence, electronic financial transaction processing eliminates the consumer's need to carry currency or checks.

Electronic financial transaction processing, as implemented in the context of common consumer use, is generally implemented in one of two ways.

The first most common implementation of electronic financial transaction processing is the automated teller machine, commonly referred to as an ATM. Over the past several years, the use of ATMs has become so widespread that it is virtually an indispensable convenience which banking customers have come to expect as a standard banking service. Generally accessible twenty-four hours a day, ATMs are commonly located at the bank site or in consumer-populated areas such as shopping centers or airports. The banking customer can use the ATM to perform most routine banking transactions such as deposits and withdrawals, account balance updates, credit card payments and so forth.

The second most common implementation of electronic financial transaction processing is the point-of-sale terminal, commonly referred to as a POS terminal. Currently, point-of-sale terminals are most commonly found at gasoline stations and grocery stores. Rather than paying for purchases by check or with cash, consumers use their electronic banking card or credit card to "pay" for their purchase by electronically transferring funds from their own account to the vendor's account. Accordingly, consumers may shop and travel without the requirement that they carry a large amount of cash in order to make purchases.

Electronic financial transaction processing, however, has created a wide variety of security problems unique to the art. While electronic financial transaction processing is highly desirable due to the the elimination of the requirement of carrying cash to make purchases and is an efficient way to accomplish transactions without substantial human intervention, security concerns are of paramount importance as the potential for abuse is considerable. Unauthorized persons, commonly referred to in the trade as "adversaries," could gain access to the electronic financial transaction processing system and conduct a wide variety of damaging fraudulent transactions. Hence, as the vault is critical to the protection of currency and commercial paper, an effective means of securing the electronic financial transaction processing system is likewise essential to the electronic financial transaction processing art.

In most existing electronic financial transaction processing systems, the bank or other card-issuing institution issues the customer a card which has been magnetically encoded with the user's account number. The bank likewise issues or permits the customer to select a personal identification number (PIN), known only to the customer, to be used in authorizing the customer's access to the electronic financial transaction processing system at the time of a given transaction. Normally, the PIN is memorized by the customer. The PIN and card enable customer access to the system and, when properly used by the individual, provide the desired access to the system.

When a customer desires to perform an electronic transaction in such a prior art system, he will enter his PIN at the ATM or POS terminal prior to proceeding with the transaction. This ATM or POS terminal also will read the card of the individual keying in the PIN. An identity verification is then typically accomplished by a comparison of the PIN or other number derived from the PIN and the customer's account number with the records of the issuing institution. Accordingly, the PIN, which is the basis for the verification process, must usually be transmitted from the ATM or POS terminal to a remote processing station or host computer for processing.

Although the above-described card and PIN system provides some protection, this system alone is not sufficiently secure to confidently maintain the integrity of the electronic financial transaction processing system.

The system is vulnerable, if, for example, the PIN itself is transmitted in an unencrypted state to a remote processing station. An adversary monitoring the transmission lines or other channel of communication could intercept the PIN and, using this information, be able to gain unauthorized access to the customer's accounts. Hence, it is not desirable to transmit the PIN from the ATM or POS terminal to the remote processing station, at least not in an unencrypted form.

Consequently, in many existing systems the PIN is transmitted from the ATM or POS terminal in encrypted form. In such a system, the PIN is encrypted using a predetermined number, known as a "key," to produce an encrypted PIN. Theoretically, the PIN, when it is transmitted to the remote processing station, is secure because it has been encrypted using a key known only to the card-issuing institution. However, if an adversary ascertains the key, the system is no longer secure as the PIN may be determined if the encryption process can be reversed.

Unauthorized acquisition of the key is a particular problem in the POS terminal environment. In the POS terminal environment, the key is typically resident within the terminal itself so as to enable on-site encryption prior to transmission. Because the POS terminal units are generally portable, there is a substantial risk that the terminal might be stolen and/or disassembled and the key ascertained. In such a scenario, the system once again becomes vulnerable because an adversary could use the key to decrypt other transmitted encrypted PINs.

Prior art improved data transmission encryption systems are also known in which a unique key is used for each transaction between a host computer and a particular terminal. In one such system, each terminal includes 21 unique key registers in which the unique keys are stored. In that system, a total of $2^{21}$ unique keys are therefore available for sequential use by the terminal to encode data transmissions between it and the host computer. Such a system is memory intensive in that it requires a large amount of non-volatile memory in each of the terminals to store the variety of keys used. The host system stores one unique host key which is used to decode the variety of transmissions from the terminals used in the system. Thus, the sequence of unique keys used to encode the transmissions is totally controlled by each particular terminal, rather than the host computer.

In this prior art system, once a key is used by the terminal to encode a particular data transmission, that particular key is discarded and the next key in the sequence is used for a next data transaction. Thus, the number of transactions is related to the number of keys stored in the terminal's non-volatile memory. The number of transactions is limited to $2^N$ where N is the maximum number of key registers available in memory. Further, in a practical sense, requiring a large amount of non-volatile memory in such systems makes them more expensive to produce due to the high cost of the nonvolatile memory chips used in the terminal.

Another disadvantage of such systems is that, once all the unique keys in the terminal are exhausted, the terminal must be retrieved from its remote location to perform a key change. Thus, the terminal must be retrieved from the field at regular intervals, based on the frequency of its use, to allow for such unique keys changes. Further, if one desired for security reasons to change the host system key, all keys used in the remote terminals would also be required to be changed. Since this would again require retrieving all terminals from their remote location, such a change in the host system key is very difficult to complete.

Accordingly, it is an object of the present invention to provide a data encryption system wherein the encryption key cannot be discovered by monitoring historical transactions.

It is another object of the present invention to provide a data encryption system wherein a plurality of encryption keys are generated by the host computer system as a function of a single master key in the host system, thereby enabling those encryption keys stored at remote terminals to be updated with new unique keys by the host system after each transaction or periodically as desired by the host computer.

It is another object of the present invention to provide a data encryption system which provides a different encryption key for each secure data transmission between a particular terminal and a host system.

It is a further object of the invention to provide a secure encryption system which requires a minimum amount of non-volatile computer memory storage.

It is a further object of the invention to provide an encryption system whose encryption keys are secure against unauthorized physical access into any remote terminal.

It is a further object of the invention to provide an encryption system wherein a plurality of encryption keys are generated as a function of a single master key stored in the host computer and wherein said plurality of encryption keys may be altered by alteration of said single master key stored in the host computer.

SUMMARY OF THE INVENTION

The invention comprises a method for encrypting data for communication between a host computer and each of a plurality of remote terminals in a network. A method is provided for periodically generating a unique dynamic encryption key for each of said plurality of terminals using a system seed key residing only in the host computer. The dynamic encryption key generated for use by said terminal in encrypting data transmitted to said host computer and for decrypting data received from said host computer. The method includes storing at said terminal the dynamic key previously generated by said host for said terminal.

The method of the invention further includes the steps of:

receiving at said host computer a new dynamic key request from one of said terminals, said new dynamic key request including a predetermined terminal identifier for said terminal;

determining in said host computer the dynamic key previously generated for said terminal by said host wherein said dynamic key previously generated by said host is currently stored in said terminal;

generating in said host computer a new dynamic key for said terminal as a function of said seed key and said predetermined terminal identifier for said terminal;

encrypting said new dynamic key in said host computer using said dynamic key previously generated by said host computer;

transmitting said encrypted new dynamic key from said host computer to said terminal;

decrypting said new dynamic key at said terminal using said dynamic key previously generated by said host currently stored in said terminal;

encrypting data at said terminal using said new dynamic key and transmitting said encrypted data to said host;

decrypting said encrypted data at said host using said new dynamic key; and storing said new dynamic key in said terminal in place of said dynamic key previously generated by said host.

DETAILED DESCRIPTION OF THE INVENTION

With reference to the attached drawings, the preferred method of the invention is hereinafter described.

Figure 1:
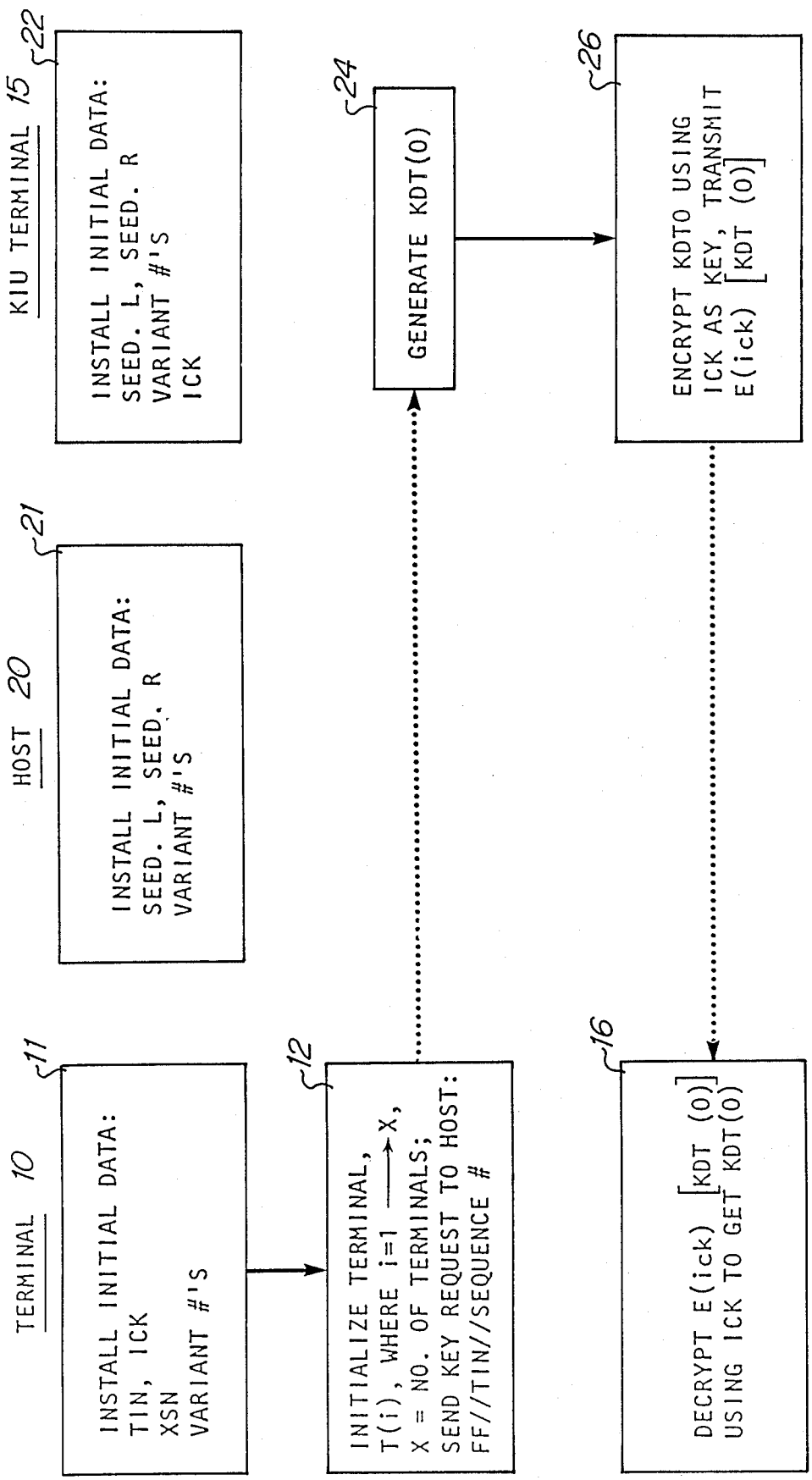
FIG. 1 is a flow chart depicting the preferred method for generating an initial dynamic key in the host computer for a given remote terminal coupled to the host computer and for effecting installation of the initial dynamic key in the remote terminal.

FIG. 1 is a flow chart depicting the steps taken in a key initialization terminal (KIU) 15, the host computer 20, and in each one of a plurality of remote terminals 10 coupled to the host computer and KIU for initializing the terminal 10 with its first dynamic key.

In the preferred embodiment, key initialization unit (KIU) performs the function of generating and downloading to the terminal the initial dynamic key, $KDT_o$. The KIU apparatus is located at a separate, physically secure location from the host and terminals to provide further security for the network. It will be recognized by those skilled in the art that the function secured by the KIU could also be performed by the host computer.

The method of FIG. 1 begins with the installation sequence 11 of terminal 10, which is required before terminal 10 can be brought on line. In the installation sequence 11, a minimum number of required data elements must be installed in the terminal. Such installation can be performed during manufacture of the terminal or by an end user of the host/terminal network. In the second instance, the network supervisor, such as a bank or savings and loan, may install their own particular set of required data. The minimum data required to be stored in terminal 10 in the installation sequence 11 under the preferred embodiment includes a terminal identification number (TIN) for said terminal, a transaction number (XSN) for said terminal, and an initial communication key (ICK) for said terminal that is common to all of the terminals served by the host computer. In addition, a number of variant numbers, whose function will become clear from the discussion of FIG. 2, preferably are also stored in terminal 10.

Likewise, initial installation sequences 21 and 22 is required in the host computer 20 and KIU 15. Like the initial installation sequence 11 for the terminal 10, the initial installation sequence 21 for the host 20 and sequence 22 for KIU 15 may be performed at the manufacturing stage or by the supervisor of the host/terminal network system. The minimum data required to be stored in the host computer 20 in the installation sequence 21, in the preferred embodiment of the method, include one or more system SEED keys (SEED.l, SEED.r) used by the host computer in the preferred embodiment, to generate a series of dynamic keys for each terminal as described below, one for each transaction or a set of transactions when a request for a new dynamic key is received from one of the terminals on the network. In addition, variant numbers equivalent to those input to terminal 10 at initial installation stage 11, are also stored in host computer 20 during the installation sequence 21. Likewise, in installation sequence 22, SEED keys and equivalent variant numbers are input to KIU 15. In addition, the initial communication key (ICE) input to terminal 10 at sequence 11, is input to KIU 15 at sequence 22.

Once the initial installation sequences 11, and 22 have been completed in the KIU 15 and each terminal 10 on the network, the particular terminal, $T_i$, may be initialized at 12 and brought on line. The method depicted in FIG. 1 for initializing the terminals in the network is performed for each terminal $T_i$, where (i) is an integer from $1-X$ and where X equals the total number of terminals in the network. During initialization step 12, the terminal 10 will transmit a key request to the KIU 15. The initialization step 12 is generally performed once the terminal is installed at its remote location.

The initialization step 12 includes the transmission of a key request for $T_i$. The key request includes data identifying $T_i$ to the KIU. On receipt of a first key request from the terminal 10, the KIU 15 thereafter generates $KDT_o$ at step 21 in accordance with the method described in FIG. 4, describing generation of any dynamic key $KDT_N$ for a particular terminal. The data sequence in the preferred method sent by the terminal 10 in requesting a key from KIU 15 at terminal initialization 12 generally includes the terminal identification number (TIN) assigned to the terminal and the transaction sequence number (XSN) for the terminal. Preferably, the XSN for a given terminal will start at 000, and be incremented by one for each transaction handled by that terminal. However, those skilled in the art will recognize that any manner of numbering consecutive transactions will function as a sequence. Additionally, in the preferred method of the invention, the data string also includes the transmission of 8 bits of FF (hex) at the beginning of the data string to provide for a data transmission totaling 64 bits.

On receipt of this data by the KIU 15, the host proceeds to generate $KDT_0$ at step 24 in accordance with the method described with reference to FIG. 4. As will be described in greater detail with reference to FIG. 4, the data input comprising the TIN and the XSN is processed through a variety of encryption steps to produce a unique $KDT_0$ for the terminal 10.

After being generated at 24, $KDT_0$ is then encrypted at 26 by the KIU 15 using ICK as the encryption key. The cryptogram expressing this encryption is expressed as $E_{ICK}[KDT_0]$. After encryption at 26 of $KDT_0$ by the KIU 15, the encrypted $KDT_0$ is transmitted to the terminal 10.

Encryption of data may be accomplished using an encryption algorithm such as the National Bureau of Standards' encryption-decryption algorithm which is the Federal Information Processing Standard approved the the U.S. Department of Commerce. The same standard National Bureau of Standards' algorithm may later be used to decrypt the encrypted data to retrieve the data in its original form.

Using the ICK that had been input during the installation sequence 11, the terminal 10 is able to decrypt $KDT_0$ at step 16 to retrieve $KDT_0$. This first dynamic key is then stored for use in encryption and decryption of subsequent data communications with host 20.

Figure 2:
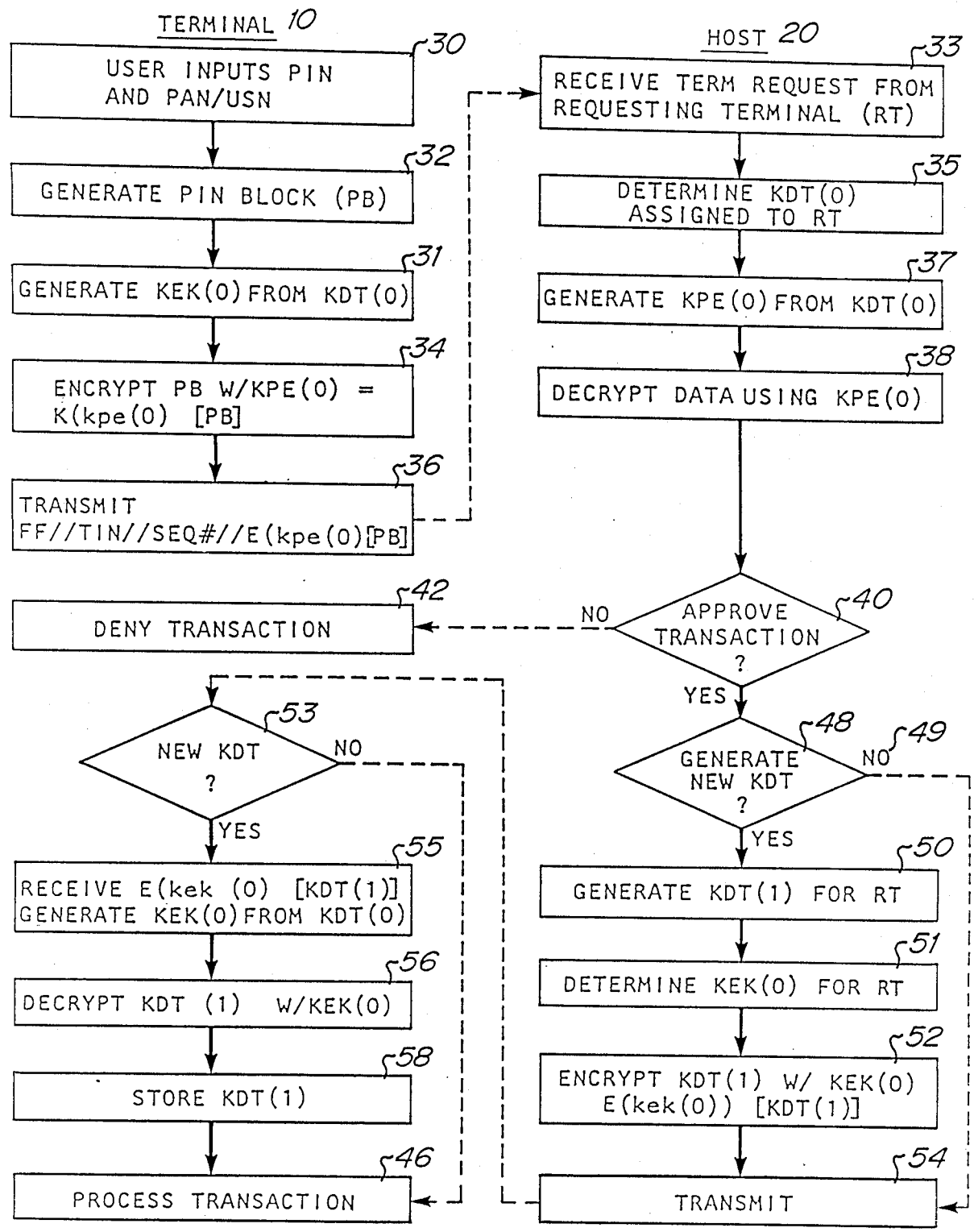
FIG. 2 is a flow chart depicting the preferred method for conducting the first user transaction between one of the remote terminals and the host computer.

FIG. 2 shows the flow chart of a preferred method for implementing the first transaction between a terminal 10 initialized with its initial dynamic key $KDT_0$ and the host computer 20.

Communication with the host computer is generally initiated by the terminal 10 when a user of the remote terminal desires to perform a transaction. The user will typically input his or her credit card into the terminal and at the same time enter a personal identification number (PIN) to initiate the transaction. The credit card usually will have a magnetic strip affixed to its back on which a stored the customer's primary account number (PAN) or, in the alternative, a user serial number (USN) which contains information allowing the host terminal to act on the user's PIN in order to authorize the transaction the user wishes to accomplish.

After data has been input by a user at 30, the terminal 10 thereafter generates a PIN block 32 through a predefined series of steps which generally combines the PIN with the PAN or USN. Any number of standard methods recognized in the art for generating this PIN block may be used. Two well know methods, for example, are concatenation and exclusive or-ing of the PIN and PAN/USN to form the PIN block. The terminal 10 then generates a variant encryption key, $KPE_0$, at 31. In the preferred method, a number of initial variant keys are used to encode the data transmissions used to perform particular transactions can be generated. Such variant keys include a initial pin encryption key ($KPE_0$) for use in encrypting a terminal user's personal identification number (PIN), a key encryption key ($KEK_0$) used for decrypting a subsequent dynamic key generated by the host, and a message key ($KMSG_0$) used for encrypting other data communications between the terminal and the host. As will be more completely described with reference to FIG. 5, the variant numbers input at the initial installation sequence 11 of FIG. 1 are used to generate these variant keys and need only be equivalent between the host and one particular terminal $T_i$. Such a configuration would require that individual sets of variant numbers be stored in the host 20 for each terminal 10 on the network, thus requiring a large amount of memory at the host. A benefit of this configuration is that it would provide a greater amount of security in the data communications. Alternatively, a second configuration contemplates a common set of variants numbers for all terminals 10, thus requiring only one set of variant numbers to be stored in the host 20.

The PIN block is then encrypted with the initial PIN encryption key ($KPE_0$) generated as described above. It should be recognized by those skilled in the art that any key may be used to encrypt the PIN block at this stage, including the initial dynamic key $KDT_0$. In the preferred method of the invention, however, the variant $KPE_0$ is used to provide additional security for the user PIN number transmitted to the host. Once encryption of the PIN block is accomplished at 34, the data, represented by cryptogram $E_{KPE(0)}[PB]$, is transmitted at 36 to the host 20.

Host 20 is in a state awaiting a transaction request from the requesting terminal ($RT_i$) at 33. The host 20 must then determine the particular $KDT_0$ output to terminal 10.

Two alternatives for determining $KPE_0$ by the host 20 contemplated by the invention. In one alternative, the host system can store the current dynamic key for each terminal $T_i$ on the network in non-volatile memory. Upon receipt of the encrypted PIN block at 33 from terminal 10, the host can retrieve from memory the current dynamic key for the terminal 10 that is requesting a transaction (RT) at 35, and use it to generate $KPE_0$ at 37, or other variants as required. In such a method, a unique memory register address in the host would be required for each particular dynamic key generated and output to each terminal $T_i$ in the network. A second alternative contemplates the use of the current data input (TIN//SEQ number) from the terminal $T_i$ requesting a transaction (RT) to regenerate the particular $KDT_0$ at 35 previously output to terminal 10. Once host 20 has determined $KDT_0$ in this manner, it can thereafter generate $KPE_0$ at 37 and other variant keys as required. The host then uses the $KPE_0$ to decrypt the PIN block at step 38.

Once the PIN block has been decrypted, the host then processes the PIN block at 40 to determine whether the input PIN and PAN/USN match, thereby signifying that the requested customer transaction should be approved. The process whereby the host system verifies the particular transaction typically consists of comparing the input PIN, or variation thereof in the form of the PIN block, to the customer's PAN or a PIN verification number which is either stored in the host 20 or coded and sent as part of the PIN block. Such verification processes are well known in the art. If the host 20 determines that the PIN and PAN/USN do not match, the host can transmit a signal indicating to the terminal to deny the transaction at 42. If the host 20 determines that the PIN and PAN/USN do match, the host can transmit approval at 54 to terminal 10 (depending on whether a new dynamic key is required as determined by the host at step 48, thereby allowing terminal 10 to process the transaction at 46. In transmission of approval of the transaction 44, a variant key such as $KMSG_0$ may be used to encrypt the data sent between the host 20 and the terminal 10.

After completion of the transaction process by the host 20, the host will then determine whether to generate a new dynamic key at 48. According to the preferred method, if the host determines that a new KDT is not required, the transaction approval will be sent to the host. It will be recognized by those skilled in the art that although FIG. 2 shows that the host approving a particular transaction at step 40 before proceeding to generate a new KDT at step 48, the invention contemplates generation of a new KDT at step 48 where the transaction is denied by the host at step 40.

Generation of a new dynamic key by the host 20 can be selectively programmed to occur at any number of regular or irregular intervals. For instance, the host could be programmed to generate a new dynamic key for each transaction, thus changing the values for all variants KPE, KEK, and KMSG on each transaction request by a terminal 10. Alternatively, the generation of a new dynamic key can occur at every 10th transaction, every 100th transaction, on a daily basis, or on a monthly basis. If it is determined by the host that a new dynamic key need not be generated after a particular transaction, the host at 49 returns to step 33 to await the next transaction request transmission from a terminal 10.

If the host determines that a new dynamic key is required, the host 20 will generate a new dynamic key $KDT_1$ at 50 using the information transmitted to the host by the terminal 10 that had requested the particular user transaction. As described with reference to FIG. 4, the preferred method of generating a new dynamic key includes the use of the TIN and sequence number, transmitted by a particular terminal, and an irreversible decryption/encryption algorithm to generate a unique dynamic key for the particular terminal $T_i$.

Once the host 20 generates $KDT_1$, the host then determines $KEK_0$ at 51 using $KDT_0$ $KEK_0$ is a variant encryption key used to encrypt $KDT_1$ before it is transmitted to terminal 10. $KDT_0$ is determinable by the host computer in the manner described above. Once encrypted, $KDT_1$ is transmitted to the terminal 10 at 54 in the form of $E_{KEK(0)}[KDT_1]$, along with the transaction approval.

Once this encrypted $KDT_1$ is received by the terminal 10 at 53 the terminal first determines whether the host 20 has transmitted a new dynamic key. If a new KDT has not been transmitted, the terminal may proceed to process the transaction 46. If a new KDT has been transmitted the terminal must generate $KEK_0$ at 55 using the stored value of $KDT_0$. $KEK_0$ is then used to decrypt the new dynamic key $KDT_1$ at 56. $KDT_1$ is then stored at step 58 in terminal 10 in place of $KDT_0$. Once $KDT_1$ is stored, the terminal 10 can use it in subsequent transactions to generate new variants $KEK_1$, $KPE_1$, and $KMSG_1$. After storage of KDT, the terminal proceeds to process the transaction at 46 under the preferred embodiment.

Figure 3:
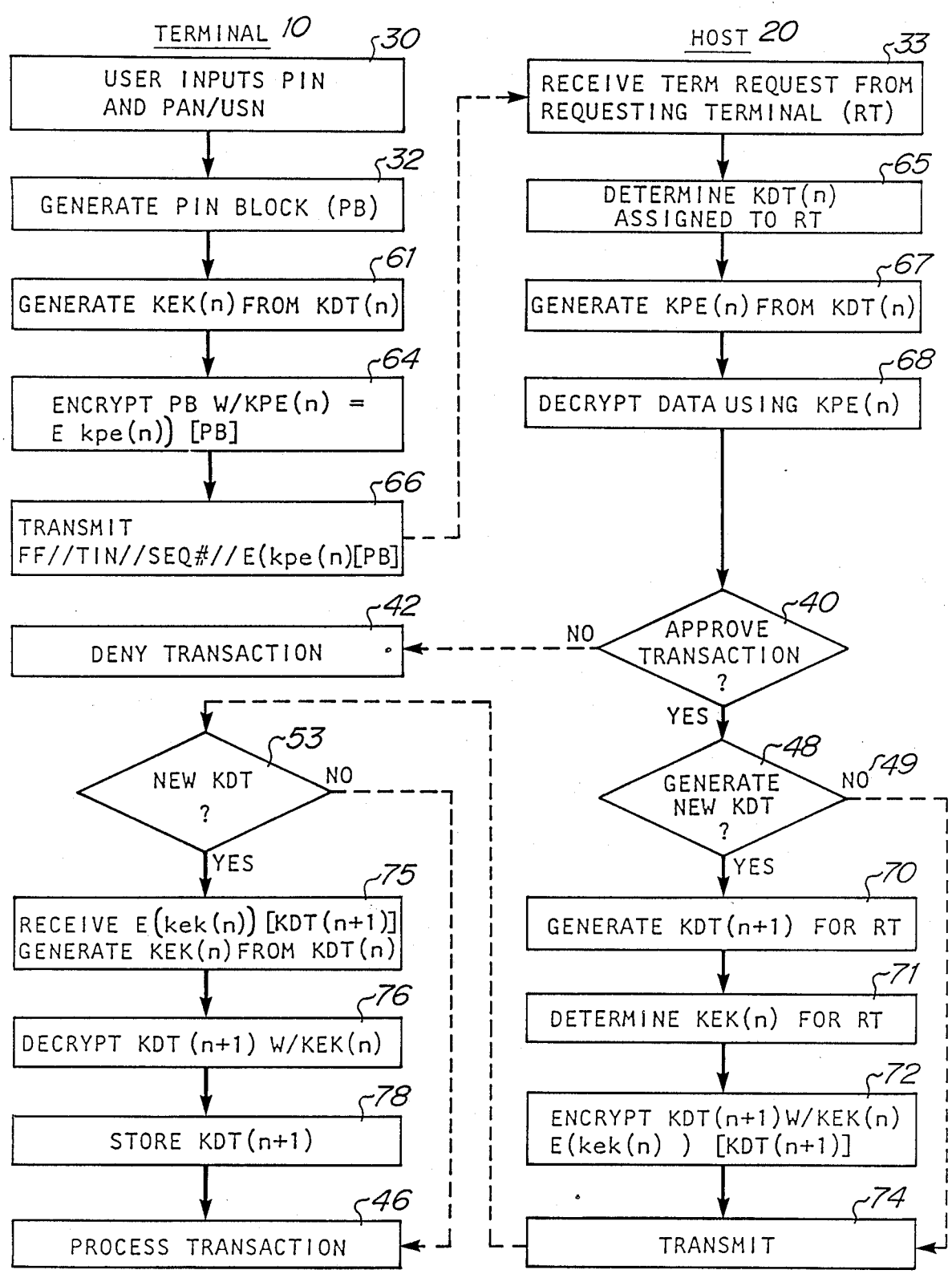
FIG. 3 is a flow chart depicting the preferred method for conducting the nth user transaction between one of the remote terminals and the host computer.

FIG. 3 is a flow chart depicting a subsequent transaction (n) in which a new dynamic key may be generated using the data information transmitted from a terminal to the host using the current dynamic key $KDT_n$. With reference to FIG. 3, the current dynamic key is defined as $KDT_n$, where n is an integer defining the number of dynamic keys previously generated by the host computer for that particular terminal 10. Therefore, $n+1$ is defined as the next dynamic key to be generated by the host computer (e.g. for $KDT_0$, $KDT_{n+1}=KDT_1$; for $KDT_1$, $KDT_{n+1}=KDT_2$...). For convenience, those steps which are equivalent to those in FIG. 2 are numbered accordingly.

As with the initial transaction described with reference to FIG. 2, the user inputs his or her credit card and PIN at 30 to provide the terminal 10 with the information necessary to generate PIN block 32. The terminal 10 thereafter generates $KPE_n$ from the stored dynamic key $KDT_n$, where $KDT_n$ was the last dynamic key transmitted by the host computer. The PIN block is then encrypted using $KPE_n$ at 64. This information is transmitted 66 to the host 20.

Host 20 receives the data 33 and thereafter determines $KDT_n$ at 65 in one of the two alternative manners described above with reference to FIG. 2. The host thereafter uses $KDT_n$ to generate $KPE_n$ at 67, which it uses to decrypt the data at 68 received from terminal 10. Once the host has the decrypted PIN block at 68, the host then performs whatever steps are necessary at 40 to decide whether or not to approve the customer transaction, as described above with reference to FIG. 2. If it does not approve the transaction, the host 20 will send a signal to terminal 10 denying the transaction at 42. If the host does approve the transaction the host computer will then decide at 48 whether a new dynamic key is required. If not, the host will return at 49 to step 33 to await the next transmission of transaction data from a terminal 10 and will transmit its approval at 44 to the terminal 10, allowing terminal 10 to process the transaction at step 46.

As with the initial transaction described above with reference to FIG. 2, a new dynamic key $KDT_n$ may be generated at step 48 even where the transaction is denied in step 40. Further, the host may transmit approval 74 allowing the terminal 10 to process the transaction prior to determination of whether a new dynamic key is required at step 48. If a new dynamic key is required, the host will generate $KDT_{n+1}$ at 70. Once $KDT_{n+1}$ is generated, the host generates $KEK_n$ 71 using $KDT_n$ in the manner described above. The host then encrypts $KDT_{n+1}$ with $KEK_n$ 72. Once encrypted, the host transmits the encrypted $KDT_{N+1}$ at 74 to terminal 10 in the form as represented by the cryptogram $E_{KEKn}[KDT_{N+1}]$.

On receipt by terminal 10 the terminal then determines whether a new KDT has been generated at 53. If so, at 75, the terminal generates $KEK_n$ using the stored value of $KDT_n$. $KEK_n$ is then used to decrypt $KDT_{n+1}$ at 76. Once $KDT_{n+1}$ is decrypted by the terminal 10, the terminal can store $KDT_{n+1}$ at 78 and can thereafter generate new variant keys $KEK_{n+1}$, $KPE_{n+1}$ and $KMSG_{n+1}$ as needed for use in subsequent transactions communicating with the host 20. Finally, the transaction is processed at 46.

Figure 4:
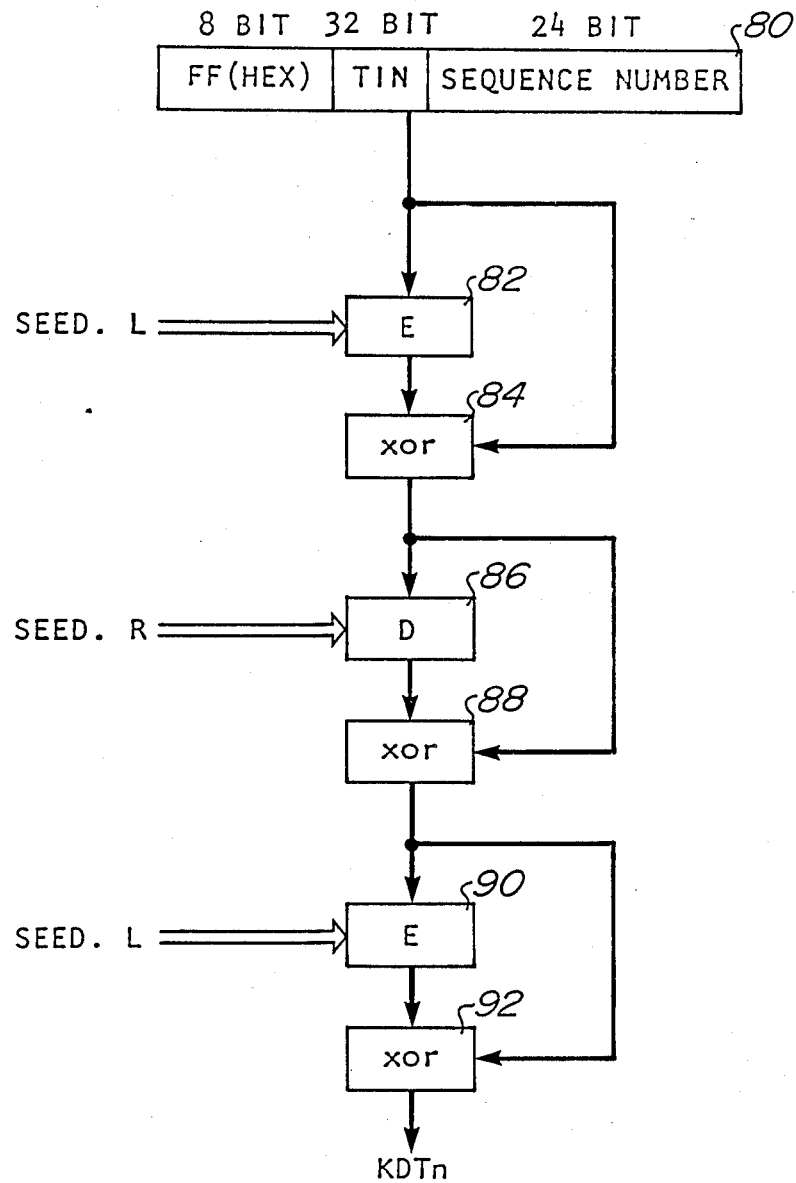
FIG. 4 is a schematic diagram depicting the preferred method for generation of the dynamic key $KDT_n$.

FIG. 4 is a schematic diagram detailing generation of a dynamic key $KDT_n$ from the information which is transmitted to host 20 by a terminal 10. FIG. 4 shows a 64 bit binary data string at 80 comprising, in sequence, 8 bits of FF hex, 32 bits of terminal identification number (TIN), and 24 bits of a sequence number. The TIN of the preferred embodiment is comprised of a customer number identifying the particular owner or operator of the host/terminal network, and a particular terminal classification number unique to that terminal in the network. Those skilled in the art will recognize that any composition of the TIN is well within contemplation of the invention. The 24 bit sequence number of the preferred embodiment is generally comprised of the transaction number XSN for the terminal, although any manner of identifying successive transactions could substitute equally well for the XSN used in the preferred embodiment. The 8 bits of FF hex leading the data string are included in the preferred embodiment to enable the data string to total 64 bits. Those skilled in the art will recognize that this number may be eliminated without varying the scope of the invention. It will be further recognized by those skilled in the art that a 64 bit data string is not required to fulfill the objects of the invention.

The data at 80 is first encrypted at 82 with a first seed key, SEED.l. The result of this first encryption is then exclusively or-ed at 84 with the initial data at 80. The result of this exclusive or-ing is then decrypted at 86 using a second seed key, SEED.r. The result of this decryption is then exclusively or-ed at 88 with the result of the exclusive or-ing at 84. The product of the exclusive or-ing at 88 is then encrypted again at 90 with the first seed key SEED.l. The product of encryption 90 is then again exclusively or-ed at 92 with the result of the exclusive or-ing at 88. The product of this exclusive-or 92 is the dynamic key.

It will be recognized by those skilled in the art that the particular method described with reference to FIG. 4 is but one way of generating the dynamic key $KDT_n$. It is well within contemplation of the invention that any irreversible encryption algorithm could be applied to the data to create a unique dynamic key for use in the encryption system described above.

Figure 5:
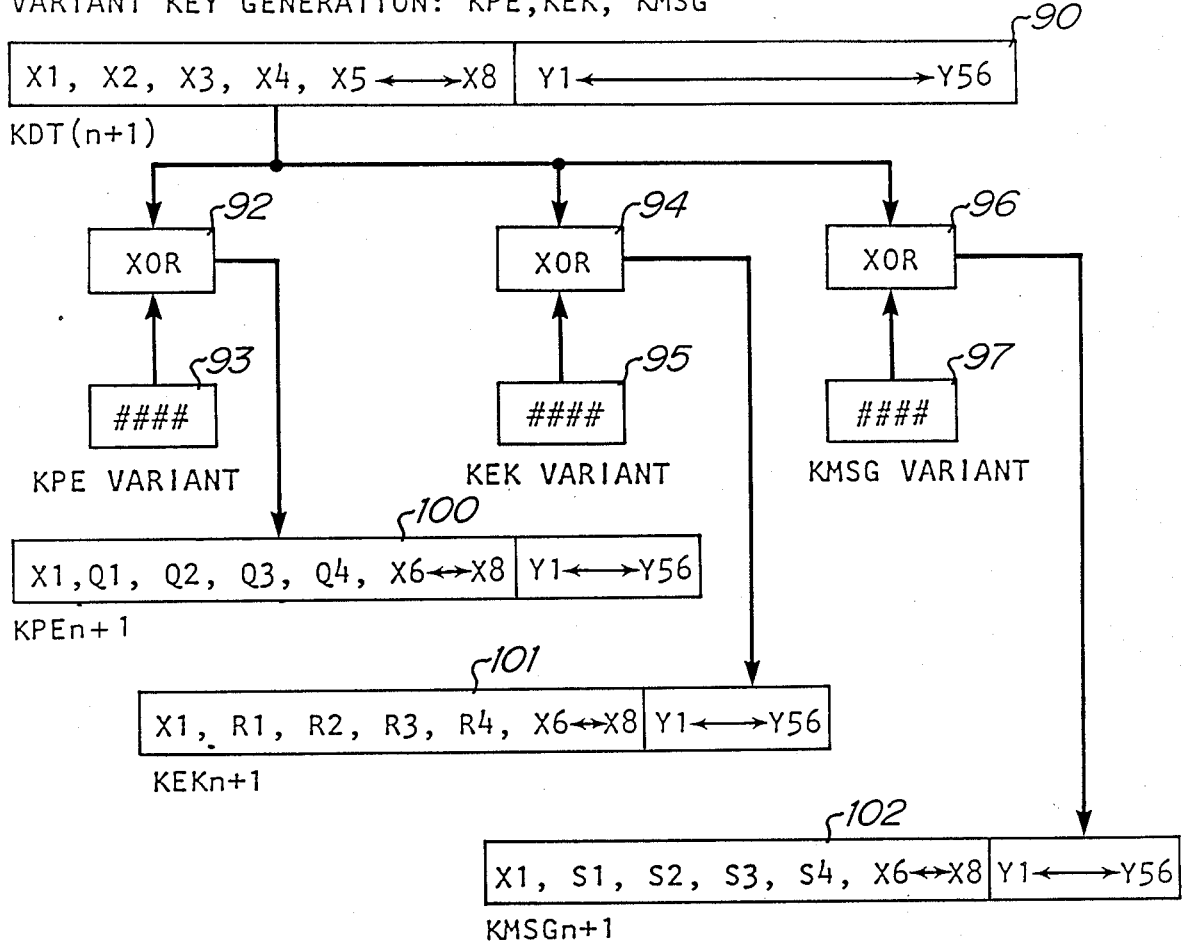
FIG. 5 is a schematic diagram depicting generation of variant encryption keys used in the preferred method to encrypt and decrypt the various different types of data transmitted between the host computer and one of the remote terminals.

FIG. 5 is a schematic diagram depicting generation of the variant keys $KPE_{n+1}$, $KEK_{n+1}$, and $KMSG_{n+1}$ after generation of a new dynamic key, $KDT_{n+1}$. In the preferred embodiment of the invention four of the first 8 bits of the 64 bit data string comprising $KDT_{n+1}$ are exclusively or-ed with a unique 4 bit variant number to generate any of the variants $KPE_{n+1}$, $KEK_{n+1}$, or $KMSG_{n+1}$. Alternatively, the variants could comprise any number of bits all of which may be applied to each 8 bit section of $KDT_{n+1}$. Also, the 4 bit variant numbers used to generate the respective KPE, KEK or KMSG's in the preferred embodiment may be common for all KPE, KEK and KMSG, in all terminals, or may be defined as different for each terminal in the system as described above with reference to FIG. 2.

With reference to FIG. 5, there is shown the 64 bit dynamic key $KDT_{n+1}$ at 90. To form $KPE_{n+1}$, four of the first 8 bits in the 64 bit data string comprising $KDT_{n+1}$ are exclusively or-ed at 92 with the 4 bit KPE variant number at 93. The result of the exclusive-or at 92 is $KPE_{n+1}$, shown at 100. Although the figure shows the second through fifth bits of $KPE_{n+1}$ as those which are altered through the exclusive-or process in step 92, it is well within contemplation of the invention to vary any combination of the first 8 bits of $KDT_{n+1}$ or any combination of 8 bit sections of the key at 90 to generate a variant key $KPE_{n+1}$.

Likewise, the KEK variant number at 95 and the KMSG variant number 97 are exclusively or-ed at 94 and 96, respectively, with $KDT_{n+1}$ to generate $KEK_{n+1}$, shown at 101, and $KMSG_{n+1}$, shown at 102. Again, it is well within contemplation of the invention to exclusively-or any four of the first 8 bits of $KDT_{n+1}$ or any combination of 8 bit sections of the key at 90 with the 4 bit variant numbers at 95 for KEK and at 97 to generate $KEK_{n+1}$ and $KMS_{n+1}$.

It is understood that although the preferred embodiments of the present method of the invention have been illustrated and described above, alternatives and equivalents thereof will become apparent to those skilled in the art and, accordingly, the scope of the present invention should be defined only in the appended claims and the equivalents thereof.

What is claimed is:

1. A method of encrypting data for on-line data communication between a host computer and each of a plurality of remote terminals, wherein a unique dynamic key is periodically generated for each said terminal using a system seed key residing only in the host computer, said dynamic key being for use by said terminal in encrypting data transmitted to said host computer and for decrypting data received from said host computer, each said terminal further including means for storing a previously generated dynamic key for said terminal, said method comprising the steps of:
   a. receiving at said host computer a new dynamic key request from one of said terminals, said new dynamic key request including a predetermined terminal identifier for said terminal;
   b. determining in said host computer the dynamic key previously generated for said terminal by said host wherein said dynamic key previously generated by said host is currently stored in said terminal;
   c. generating in said host computer a new dynamic key for said terminal as a function of said seed key and said predetermined terminal identifier for said terminal;
   d. encrypting said new dynamic key in said host computer using said dynamic key previously generated by said host computer;
   e. transmitting said encrypted new dynamic key from said host computer to said terminal;
   f. decrypting said new dynamic key at said terminal using said dynamic key previously generated by said host currently stored in said terminal;
   g. encrypting data at said terminal using said new dynamic key and transmitting said encrypted data to said host;
   h. decrypting said encrypted data at said host using said new dynamic key; and
   i. storing said new dynamic key in said terminal in place of said dynamic key previously generated by said host.

2. The method of claim 1 wherein steps a through i are repeated for each transaction.

3. The method of claim 1 including generating at said host computer and said terminal a plurality of transaction data encryption keys using a plurality of variants, wherein said plurality of variants are common to said host system and said of terminal, and wherein said plurality of variants generate said plurality of transaction data encryption keys as a function of said new dynamic key.

4. The method of claim 3 wherein transaction data transmitted between said host computer and said one of said plurality of terminals is encrypted with said transaction data encryption keys.

5. The method of claim 4 wherein said transaction data encryption keys include at least a key encryption key and a PIN encryption key.

6. The method of claim 5 wherein said variant generating means includes a plurality of variant numbers, each of said plurality of variant numbers corresponding to one of each of said plurality of transaction data encryption keys.

7. The method of claim 6 wherein said variant generating means includes means for exclusively or-ing each of said plurality of variant numbers with said first dynamic key wherein each of said corresponding plurality of transaction data keys is formed.

8. The method of claim 7 wherein said variant numbers are comprised of a 4 bit data input and wherein said means for exclusively or-ing said variant numbers with said first dynamic key exclusively or's said 4 bit input with a selected 4 bits in the first 8 bits of said dynamic key input string.

9. The method of claim 3 wherein steps a through i are repeated for each transaction.

10. The method of claim 3 wherein steps a through i are selectively repeated at predetermined intervals.

11. The method of claim 3 wherein one of said plurality of transaction encryption keys is used to encrypt said data at said terminal.

12. The method of claim 1 wherein said new dynamic key request further includes a transaction number for said terminal.

13. The method of claim 12 wherein said new dynamic key is generated by said host as a function of said seed key and said predetermined terminal identifier for said terminal, and said transaction number for said terminal.

14. The method of claim 1 wherein said host computer and said plurality of terminals comprises a card activation and pin selection system.

15. The method of claim 1 wherein said host computer and said plurality of terminals comprises an Electronic Funds Transfer System with Point of Sale Terminals.

16. The method of claim 1 wherein said host computer and said plurality of terminals comprises an Automated Teller Network.

17. The method of claim 1 wherein said dynamic key is comprised of a 64 bit data input string.

18. The method of claim 1 including one or more additional seed keys and wherein said one or more additional seed keys are used to generate said new dynamic key.

19. The method of claim 1 further including a plurality of seed keys for use in generating said new dynamic key.

20. The method of claim 19 wherein each of said seed keys is selectively variable through input means of the host computer.

21. The method of claim 1 including generating at said host computer and said terminal a plurality of transaction data encryption keys using a plurality of variants, wherein said plurality of variants are common to said host system and said one of said plurality of terminals, and wherein said plurality of variants generate said plurality of transaction data encryption keys as a function of said new dynamic key.

22. In a network comprising a host computer and a plurality or remote terminals, a method for safeguarding the on-line transmission of data between said host computer and any one of said plurality of remote terminals wherein a unique encryption key is used for each transmission of data between said host computer and said one of said plurality of terminals, said unique encryption key being derived as function of a unique dynamic key generated using a system seed key residing only in said host computer wherein a plurality of unique dynamic keys may be generated as a function of said seed key, and wherein N is a finite integer greater than or equal to 1 that defines the number of unique dynamic keys generated as a function of said seed key, said generation of said unique dynamic keys being programmable to occur at preselected intervals, comprising the steps of:
   a. generating in said host computer an nth dynamic key for said one of said plurality of terminals, wherein said nth dynamic key is a function of said seed key and a predetermined terminal identifier for said one of said plurality of terminals;
   b. encrypting said nth dynamic key in said host computer using the $(n-1)^{th}$ dynamic key, wherein said $(n-1)^{th}$ dynamic key is also stored at said one of said plurality of terminals;
   c. transmitting said encrypted nth dynamic key from said host computer to said one of said plurality of terminals;
   d. decrypting said nth dynamic key at said terminal using said $(n-1)^{th}$ dynamic key stored at said one of said plurality of terminals;
   e. encrypting data at said one of said plurality of terminals using said nth dynamic key and transmitting said encrypted data to said host;
   f. decrypting said encrypted data at said host using said nth dynamic key.

23. The method of claim 22 wherein steps a through f are selectively repeated at predetermined intervals.

24. The method of claim 22 including one or more additional seed keys and wherein said one or more additional seed keys are used to generate said (n+1) dynamic key.

25. A method of encrypting data for on-line data communication between a host computer and each of a plurality of remote terminals, wherein a unique dynamic key is periodically generated for each said terminal using a system seed key residing only in the host computer, said dynamic key being for use by said terminal in encrypting data transmitted to said host computer and for decrypting data received from said host computer, each said terminal further including means for storing a previously generated dynamic key for said terminal, said method comprising the steps of:
   a. receiving at said host computer a new dynamic key request from one of said terminals, said new dynamic key request including a predetermined terminal identifier for said terminal;
   b. determining in said host computer the dynamic key previously generated for said terminal by said host wherein said dynamic key previously generated by said host is currently stored in said terminal;
   c. generating in said host computer a new dynamic key for said terminal as a function of said seed key and said predetermined terminal identifier for said terminal;
   d. encrypting said new dynamic key in said host computer using said dynamic key previously generated by said host computer;
   e. transmitting said encrypted new dynamic key from said host computer to said terminal;
   f. decrypting said new dynamic key at said terminal using said dynamic key previously generated by said host currently stored in said terminal;

26. The method of claim 25 including generating at said host computer and said terminal a plurality of transaction data encryption keys using a plurality of variants, wherein said plurality of variants are common to said host system and said one of said plurality of terminals, and wherein said plurality of variants generate said plurality of transaction data encryption keys as a function of said new dynamic key.

27. The method of claim 26 wherein said plurality of transaction data encryption keys are used to encode data transmitted between said host and one of said plurality of terminals.

28. The method of claim 27 wherein steps a through f are selectively repeated at predetermined intervals.

29. The method of claim 25 including one or more additional seed keys and wherein said one or more additional seed keys are used to generate said first dynamic key.

30. The method of claim 29 wherein each of said seed keys is selectively variable through input means of the host computer.

31. A method of encrypting data for on-line data communication between a host computer and each of a plurality of remote terminals, wherein a unique dynamic key is periodically generated for each said terminal using a system seed key residing only in the host computer, said dynamic key being for use by said terminal in encrypting data transmitted to said host computer and for decrypting data received from said host computer, each said terminal further including means for storing a previously generated dynamic key for said terminal, said method comprising the steps of:
   a. sending a new dynamic key request to said host computer, said new dynamic key request comprising at least a terminal identification number for said terminal and a terminal transaction number for said terminal;
   b. receiving from said host computer an encrypted new dynamic key, wherein said new dynamic key is generated as a function of said new dynamic key request and said new dynamic key is encrypted by said host with a previously generated dynamic key;
   c. decrypting said new dynamic key at said terminal using said dynamic key previously generated by said host currently stored in said terminal;
   d. encrypting data at said terminal using said new dynamic key and transmitting said encrypted data to said host;
   e. decrypting said encrypted data at said host using said new dynamic key; and
   f. storing said new dynamic key in said terminal in place of said dynamic key previously generated by said host.

32. The method of claim 31 including generating at said host computer and said terminal a plurality of transaction data encryption keys using a plurality of variants, wherein said plurality of variants are common to said host system and said one of said plurality of terminals, and wherein said plurality of variants generate said plurality of transaction data encryption keys as a function of said new dynamic key.

33. The method of claim 32 wherein said plurality of transaction data encryption keys are used to encode data transmitted between said host and one of said plurality of terminals.

34. The method of claim 31 including one or more additional seed keys and wherein said one or more additional seed keys are used to generate said first dynamic key.

35. The method of claim 34 wherein each of said seed keys is selectively variable through input means of the host computer.

UNITED STATES PATENT AND TRADEMARK OFFICE
CERTIFICATE OF CORRECTION

PATENT NO. : 4,933,971
DATED : June 12, 1990
INVENTOR(S) : Ralph R. Bestock, Jae-Young Kim, Webster D. Hopkins and Martin M. Atalla It is certified that error appears in the above-identified patent and that said Letters Patent is hereby corrected as shown below:

ON TITLE PAGE:

The filing date should read -- March 14, 1989 --.

Signed and Sealed this

Twenty-sixth Day of May, 1992

Attest:

DOUGLAS B. COMER

Attesting Officer     Acting Commissioner of Patents and Trademarks